(12) United States Patent
Frederick et al.

(10) Patent No.: US 11,726,226 B2
(45) Date of Patent: Aug. 15, 2023

(54) MANAGING VEHICLE MOVEMENT IN AISLES BY USE OF MAGNETIC VECTORS

(71) Applicant: Frederick Energy Products, LLC, Huntsville, AL (US)

(72) Inventors: Larry D. Frederick, Huntsville, AL (US); Dean Estill, Huntsville, AL (US); Andrew Nichols, Huntsville, AL (US)

(73) Assignee: Frederick Energy Products, LLC, Huntsville, AL (US)

( * ) Notice: Subject to any disclaimer, the term of this patent is extended or adjusted under 35 U.S.C. 154(b) by 0 days.

(21) Appl. No.: 17/456,734

(22) Filed: Nov. 29, 2021

(65) Prior Publication Data

US 2022/0082722 A1    Mar. 17, 2022

Related U.S. Application Data

(63) Continuation of application No. 16/815,372, filed on Mar. 11, 2020, now Pat. No. 11,221,428, which is a continuation of application No. 15/684,301, filed on Aug. 23, 2017, now Pat. No. 10,591,627.

(60) Provisional application No. 62/419,165, filed on Nov. 8, 2016.

(51) Int. Cl.
*G01V 3/08* (2006.01)
*G05D 1/02* (2020.01)

(52) U.S. Cl.
CPC ........... *G01V 3/081* (2013.01); *G05D 1/0265* (2013.01); *G05D 2201/0216* (2013.01)

(58) Field of Classification Search
CPC ...... G01V 3/081; G01V 3/165; G05D 1/0265; G05D 1/0263; G05D 2201/0216; G08G 1/01; G06M 7/00

USPC ......... 324/205, 207.13, 207.22, 207.26, 340, 324/686.1, 686.6, 573, 691
See application file for complete search history.

(56) References Cited

U.S. PATENT DOCUMENTS

| | | | | |
|---|---|---|---|---|
| 3,624,598 A * | 11/1971 | Foster | ....................... | G01S 1/02 340/979 |
| 4,658,214 A | 4/1987 | Petersen | | |
| 5,131,154 A * | 7/1992 | Schierbeek | ............ | G01C 17/38 33/356 |
| 5,589,775 A * | 12/1996 | Kuckes | ............... | E21B 47/0228 175/45 |
| 6,009,357 A * | 12/1999 | Wellman | .............. | G05D 1/0229 340/905 |
| 6,172,499 B1 * | 1/2001 | Ashe | .................... | G01D 5/2093 324/225 |
| 6,255,793 B1 * | 7/2001 | Peless | .................. | A01D 34/008 318/580 |
| 6,417,641 B2 * | 7/2002 | Peless | .................. | G05D 1/0274 318/587 |

(Continued)

FOREIGN PATENT DOCUMENTS

EP    1869785 B1    12/2014

*Primary Examiner* — Jermele M Hollington
*Assistant Examiner* — Sean Curtis
(74) *Attorney, Agent, or Firm* — Merchant & Gould P.C.

(57) ABSTRACT

Proximity detection systems and proximity detections methods are disclosed herein. In one aspect of the disclosure the systems and methods include measuring and analyzing the vector components of a generated magnetic field. In another aspect of the present disclosure, the results of the vector component measurements are used to take safety actions which may result in an alert to an operator or pedestrian, and/or automatic action by a vehicle or machine.

20 Claims, 9 Drawing Sheets

(56) References Cited

U.S. PATENT DOCUMENTS

| | | | |
|---|---|---|---|
| 6,543,146 B2* | 4/2003 | Smith | G01C 17/38 33/356 |
| 6,850,024 B2* | 2/2005 | Peless | G05D 1/0227 318/587 |
| 6,984,952 B2* | 1/2006 | Peless | G05D 1/0261 318/507 |
| 7,149,627 B2* | 12/2006 | Ockerse | G01C 17/38 702/92 |
| 7,266,452 B2* | 9/2007 | Ockerse | G01C 17/38 702/92 |
| 7,379,814 B2* | 5/2008 | Ockerse | G01C 17/38 701/530 |
| 7,417,543 B2* | 8/2008 | Bergman | G08B 25/08 335/154 |
| 7,420,471 B2 | 9/2008 | Frederick et al. | |
| 7,427,929 B2* | 9/2008 | Bauer | G08G 1/162 340/471 |
| 7,986,247 B2* | 7/2011 | Bauer | G08G 1/162 340/904 |
| 8,169,335 B2* | 5/2012 | Frederick | G08B 21/0213 340/691.7 |
| 8,232,888 B2* | 7/2012 | Frederick | G08B 3/10 119/721 |
| 8,314,702 B2* | 11/2012 | Garrett | H04B 5/00 343/822 |
| 8,446,277 B2* | 5/2013 | Frederick | F16P 3/145 340/539.22 |
| 8,463,569 B2* | 6/2013 | Cain | G01C 17/02 702/92 |
| 8,552,882 B2* | 10/2013 | Frederick | G08B 21/0213 340/691.1 |
| 8,676,426 B1* | 3/2014 | Murphy | G05D 1/0265 318/587 |
| 8,710,979 B2* | 4/2014 | Frederick | G08B 21/0213 340/567 |
| 8,725,317 B2* | 5/2014 | Elston | B60W 10/20 340/904 |
| 8,725,362 B2* | 5/2014 | Elston | B66F 9/07581 701/1 |
| 8,725,363 B2* | 5/2014 | Elston | B60W 10/20 701/1 |
| 8,749,387 B2* | 6/2014 | Fawcett | G08B 13/149 340/568.1 |
| 8,810,390 B2 | 8/2014 | Frederick | |
| 8,847,780 B2* | 9/2014 | Frederick | F16P 3/145 324/228 |
| 9,081,046 B2* | 7/2015 | Frederick | G08B 21/22 |
| 9,109,905 B2* | 8/2015 | Hsu | G01V 3/34 |
| 9,153,118 B2* | 10/2015 | Frederick | G08B 21/0213 |
| 9,202,374 B2* | 12/2015 | Gauger | G08G 1/0962 |
| 9,230,419 B2* | 1/2016 | Beggs | B60Q 1/2673 |
| 9,466,216 B2* | 10/2016 | Frederick | G08G 1/166 |
| 9,542,824 B2* | 1/2017 | Beggs | G08B 21/02 |
| 9,547,969 B2* | 1/2017 | Beggs | G08B 5/36 |
| 9,633,537 B2* | 4/2017 | Beggs | G08G 1/005 |
| 9,645,968 B2* | 5/2017 | Elston | G05D 1/0033 |
| 9,713,303 B2* | 7/2017 | Jägenstedt | B60L 53/16 |
| 9,805,579 B2* | 10/2017 | Frederick | G08B 21/22 |
| 9,822,927 B2* | 11/2017 | Frederick | F16P 3/145 |
| 9,898,930 B2* | 2/2018 | Frederick | B60Q 9/008 |
| 10,167,998 B2* | 1/2019 | Frederick | H03K 17/9522 |
| 10,170,000 B2* | 1/2019 | Frederick | G08B 3/10 |
| 10,591,627 B2* | 3/2020 | Frederick | G01V 3/081 |
| 10,830,392 B2* | 11/2020 | Frederick | F16P 3/145 |
| 11,221,428 B2* | 1/2022 | Frederick | G01V 3/081 |
| 2002/0100178 A1* | 8/2002 | Smith | G01C 17/38 33/356 |
| 2004/0254727 A1 | 12/2004 | Ockerse et al. | |
| 2005/0179545 A1* | 8/2005 | Bergman | G08B 25/10 340/539.1 |
| 2009/0128139 A1* | 5/2009 | Drenth | G01R 33/02 324/207.22 |
| 2010/0114405 A1* | 5/2010 | Elston | B60W 30/09 701/1 |
| 2012/0098653 A1* | 4/2012 | Slack | G08G 1/163 340/435 |
| 2014/0067184 A1* | 3/2014 | Murphy | G05D 1/0265 701/23 |
| 2014/0191869 A1* | 7/2014 | Frederick | H03K 17/9522 340/551 |
| 2014/0357353 A1* | 12/2014 | Popovich | G07F 17/3239 463/29 |
| 2015/0170498 A1* | 6/2015 | Beggs | G08G 1/005 340/686.6 |
| 2015/0247903 A1* | 9/2015 | Maurio | G01R 33/028 324/207.13 |
| 2015/0308861 A1* | 10/2015 | Jung | G01R 33/0206 324/207.22 |
| 2015/0317897 A1* | 11/2015 | Frederick | G08B 21/22 340/686.6 |
| 2015/0373906 A1* | 12/2015 | Jägenstedt | B60L 3/0061 901/1 |
| 2016/0334212 A1* | 11/2016 | Favilla | G01D 5/16 |
| 2017/0090568 A1* | 3/2017 | Chen | G06F 3/014 |
| 2018/0027600 A1* | 1/2018 | Lawlis | H04W 12/02 713/168 |
| 2018/0128932 A1* | 5/2018 | Frederick | G01V 3/081 |
| 2019/0219421 A1* | 7/2019 | Hoffmann | G01D 21/00 |
| 2019/0265718 A1* | 8/2019 | Lee | A01D 34/008 |
| 2020/0209422 A1* | 7/2020 | Frederick | G05D 1/0265 |
| 2022/0082722 A1* | 3/2022 | Frederick | G05D 1/0265 |

* cited by examiner

| AXIAL DISTANCE (feet) | PEAK MAGNETIC FIELD AMPLITUDE (A/m) | ADJACENT AISLE | |
|---|---|---|---|
| | | AXIAL FIELD UNIT VECTOR (AXIS 1) | RADIAL FIELD UNIT VECTOR (AXIS 2) |
| 0 | 5.44E-03 | -1.00 | 0.00 |
| 5 | 5.25E-03 | -0.57 | -0.82 |
| 10 | 4.14E-03 | 0.01 | -1.00 |
| 15 | 2.77E-03 | 0.38 | -0.93 |
| 20 | 1.76E-03 | 0.59 | -0.81 |
| 25 | 1.14E-03 | 0.71 | -0.70 |
| 30 | 7.55E-04 | 0.79 | -0.61 |

FIG. 3

| TRUCKS IN SAME AISLE | | | | | | | |
|---|---|---|---|---|---|---|---|
| Dist (ft) | Vx | Vy | Vz | CV | X/Y | FIT |
| 43.00 | 491 | 94 | 230 | 554 | 6.39 | 6.47 |
| 42.42 | 473 | 134 | 224 | 544 | 3.99 | 6.72 |
| 41.17 | 484 | 69 | 180 | 522 | 8.46 | 7.24 |
| 39.83 | 481 | 75 | 192 | 525 | 7.58 | 7.78 |
| 38.83 | 472 | 78 | 224 | 529 | 6.79 | 8.17 |
| 37.75 | 479 | 82 | 218 | 534 | 6.59 | 8.59 |
| 36.67 | 646 | 79 | 233 | 692 | 9.11 | 9.00 |
| 35.42 | 949 | 72 | 246 | 983 | 14.32 | 9.46 |
| 33.92 | 1082 | 89 | 285 | 1123 | 12.96 | 10.00 |
| 32.67 | 1084 | 98 | 310 | 1133 | 11.88 | 10.44 |
| 32.00 | 1122 | 128 | 395 | 1197 | 9.39 | 10.66 |
| 23.33 | 2746 | 262 | 669 | 2839 | 10.61 | 13.28 |
| 20.75 | 2865 | 336 | 808 | 3015 | 8.61 | 13.95 |
| 16.08 | 2929 | 153 | 850 | 3054 | 19.41 | 15.01 |

FIG. 5

| Dist (ft) | Vx | Vy | Vz | CV | X/Y |
|---|---|---|---|---|---|
| 0.0 | 2905 | 180 | 844 | 3030 | 16.23 |
| 1.0 | 2902 | 782 | 476 | 3043 | 3.71 |
| 1.8 | 2894 | 1191 | 246 | 3139 | 2.43 |
| 2.8 | 2840 | 1595 | 131 | 3260 | 1.78 |
| 3.8 | 2327 | 1952 | 377 | 3061 | 1.19 |
| 4.5 | 1627 | 2078 | 603 | 2707 | 0.78 |
| 5.6 | 913 | 2156 | 816 | 2480 | 0.42 |
| 6.8 | 530 | 2060 | 705 | 2240 | 0.26 |
| 7.9 | 313 | 1843 | 432 | 1918 | 0.17 |
| 8.8 | 197 | 1725 | 353 | 1772 | 0.11 |
| 9.7 | 55 | 1607 | 317 | 1639 | 0.03 |
| 11.2 | 89 | 1538 | 373 | 1586 | 0.06 |
| 12.3 | 175 | 1510 | 479 | 1594 | 0.12 |
| 14.8 | 270 | 1222 | 434 | 1325 | 0.22 |
| 18.0 | 248 | 608 | 24 | 658 | 0.41 |
| 21.5 | 308 | 578 | 42 | 658 | 0.53 |
| 24.6 | 309 | 577 | 34 | 656 | 0.54 |

TRUCKS IN ADJACENT AISLE

FIG. 6

MANAGING VEHICLE MOVEMENT IN AISLES BY USE OF MAGNETIC VECTORS

This application is a continuation of U.S. application Ser. No. 16/815,372, filed Mar. 11, 2020, now U.S. Pat. No. 11,221,428, which is a continuation of U.S. application Ser. No. 15/684,301, filed Aug. 23, 2017, now U.S. Pat. No. 10,591,627, which claims priority to U.S. provisional patent application 62/419,165, filed Nov. 8, 2016, which are hereby incorporated by reference in their entirety.

BACKGROUND

This disclosure relates generally to proximity detection systems at work sites, and in particular to proximity detection systems that allow system response to be altered depending on the particular operational situation.

Proximity detection systems (PDS) and collision avoidance systems (CAS) are now being used throughout much of the industrial world to help prevent pedestrians from being hit by moving vehicles and to prevent vehicles from colliding with each other. Additionally, these systems help keep personnel and vehicles away from dangerous areas or situations, prevent damage to facility elements that can be damaged by mobile machines, and control the actions and movements of vehicles and pedestrians. Telemetrics have expanded the utility of these systems by providing interaction between safety-related elements and by providing objective information about safety events, traffic control, and safety performance of equipment, policies, procedures, and other information. Yet, some industrial applications have not been able to fully utilize these earlier approaches because special circumstances or conditions in some industrial environments prevent the PDS/CAS systems from being effective or practical to use.

Advancement of magnetically-based CAS has made significant safety improvements that help prevent collisions between vehicles, machines, and pedestrians. The high reliability and precision of these low frequency systems has led to a variety of system configurations and devices that protect pedestrians, prevent collisions between vehicles and/or machines, and prevent collisions with facility items. Examples of these devices are disclosed in U.S. Pat. No. 7,420,471 (the '471 patent), U.S. Pat. No. 8,169,335 (the '335 patent), U.S. Pat. No. 8,552,882 (the '882 patent) U.S. Pat. No. 8,232,888 (the '888 patent), U.S. Pat. No. 8,446,277 (the '277 patent), U.S. Pat. No. 8,847,780 (the '780 patent), U.S. Pat. No. 8,710,979 (the '979 patent), U.S. Pat. No. 8,810,390 (the '390 patent) and U.S. patent publication 2014/0191869 (the '869 publication), which patents and publications are herein referred to collectively as the "Frederick patents," the disclosures of which are incorporated herein by reference in their entireties. The Frederick patents, for example, have been used successfully on, for example, fork trucks, loaders, top picks, floor sweepers, tractors, cranes, and other types of machinery.

However, improvements are needed to allow other additional safety improvements to be made within warehouse settings where storage racks are essential parts of a facility. Materials handling vehicles transport materials into rack areas, store into rack systems, and later retrieve these items. Travels to and from the rack areas usually occur on roadways that connect areas within the facility. Collisions between these vehicles occur while operating within aisles. These collisions result in costly damage and injury to personnel. In addition, pedestrians must occasionally enter such rack areas for a variety of reasons, and can be struck by these materials handling vehicles, in addition to possibly being hit or crushed in other areas within the warehouse. Managing the movement of these machines and the pedestrians has been improved by use of procedures, safety tools, training, detection systems, and other means. However, collisions continue to occur and continue to be a problem.

Previous attempts to help improve the movement of vehicles and personnel by use of electronically-based and/or radio frequency (RF) systems, such as radio-frequency identification (RFID), have usually resulted in an unacceptable number of nuisance alarms. Magnetically-based systems are especially effective for detecting vehicles and pedestrians that are equipped with PDS and CAS since the magnetic fields will pass through racks and other materials to detect where visibility is blocked. However, these magnetic fields may detect other vehicles, even when trucks are safely separated by the storage racks so that they also produce nuisance alarms.

There is a need to maximize the ability to detect vehicles in the aisles between racks while avoiding nuisance alarms from trucks in other aisles, while at the same time also providing detection of pedestrians. A special situation that is especially dangerous is when materials handling systems and/or pedestrians are exiting from an aisle between racks into roadways. A properly configured PDS/CAS that will be effective within rack storage systems can also be able to reliably provide detection and warnings at these intersections.

The current disclosure provides solutions to some of these specific needs by using vector components instead of only using magnetic field strength. Instead of relying solely upon the strength of magnetic fields as a basis for establishing safety boundaries and for providing detection methodologies, the current disclosure makes it possible to utilize unit vectors or vector components of a magnetic field to better differentiate between true safety threats and non-threats that give the appearance of being a threat.

SUMMARY

Disclosed herein are proximity detection systems and methods utilizing magnetic vector components. In one aspect of the disclosure, a proximity detection system is disclosed having at least one magnetic field generator associated with a first location configured to generate at least one magnetic field. In another aspect, the system includes at least one magnetic field detector associated with a second location, the at least one magnetic field detector having at least two detection axes. In another aspect of the disclosure the at least two detection axes are oriented at angles from each other. In yet another aspect of the disclosure a magnetic field detector is configured to determine a strength of the magnetic field in each of at least two vector components corresponding to at least two detection axes and to generate a signal based on the determined magnetic field vector component strengths to indicate the proximity of first and second locations towards one another.

In one aspect of the disclosure, a proximity detection system is disclosed where a first location is one of a vehicle, a stationary location, and a person. In another aspect of the disclosure a second location is one of a vehicle, a person, and a stationary location. And in another aspect of the disclosure, a location is an immobile hazardous location. In yet another aspect a proximity detection system is disclosed where the axes are orthogonal. In another aspect of the disclosure a magnetic field detector is configured to determine a relative strength of at least two vector components.

In one aspect of a disclosed proximity detection system, a magnetic field generator and/or magnetic field detector includes a compass and the magnetic field detector is configured to generate a signal based on determined magnetic field vector component strengths and the compass direction. In yet another aspect of the disclosure, a proximity detection system is disclosed where the first location is a first vehicle and the second location is a second vehicle, each first and second vehicles having respective magnetic field generators (MFG) and magnetic field detectors (MFD), wherein each vehicle generates a compass direction and is configured to generate the signal based on the determined magnetic field vector component strengths and the two compass directions. And in yet another aspect of the disclosure, where no signal is generated unless the first and second vehicles are approaching one another. And in another aspect of the disclosure, where a magnetic field detector is configured to determine the relative strength of the at least two vector components at a field strength threshold.

In one aspect of the disclosure, a proximity detection system is disclosed where a first location is a first vehicle and the first vehicle determines its orientation based on a signal received from an aisle alignment guidance system. In another disclosed aspect, an aisle alignment guidance system is a buried wire guidance system. And in yet another disclosed aspect, a first vehicle is adapted to transmit its compass heading to a second vehicle and the second vehicle is configured to generate a signal based on a comparison between the two respective compass directions.

Disclosed herein are methods of proximity detections. In one aspect, a method of proximity detection is disclosed where the method includes generating at least one magnetic field associated with a first location. In another aspect, disclosed methods include determining a strength of a magnetic field at a second location in each of at least two vector components corresponding to at least two detection axes of a magnetic field detector. In another aspect, disclosed methods include at least two detection axes oriented at angles from each other. In one aspect of the present disclosure the methods include generating a signal based on determined magnetic field vector component strengths to indicate the proximity of first and second locations towards one another. In one particular aspect of proximity detection methods, a first location is one of a vehicle, a stationary location, and a person. In another aspect of disclosed methods, a second location is one of a vehicle, a person, and a stationary location. In yet another aspect of the disclosed methods, a location is an immobile hazardous location. In one aspect of the disclosed methods disclosed axes are orthogonal.

In one aspect of disclosed proximity detection methods, a method includes determining a relative strength of the at least two vector components. In another aspect, a method include generating a signal based on determined magnetic field vector component strengths and a compass direction. And in yet another aspect of the present application, a first location is a first vehicle and a second location is a second vehicle, each first and second vehicles having respective magnetic field generators (MFG) and magnetic field detectors (MFD), and each vehicle generates a compass direction and generates the signal based on the determined magnetic field vector component strengths and the two compass directions. The disclosed methods, in one aspect, include no signal is generated unless a first and second vehicles are approaching one another. And in yet another aspect the methods include determining a relative strength of the at least two vector components at a field strength threshold.

In one aspect of the disclosed proximity detection methods, a method includes a first location is a first vehicle determining, by the first vehicle, its orientation based on a signal received from an aisle alignment guidance system. In another aspect, an aisle alignment guidance system is a buried wire guidance system. And in yet another aspect, a method includes transmitting, by the first vehicle, its compass heading to the second vehicle and the second vehicle generating the signal based on a comparison between the two compass directions.

These and other features and advantages of the present disclosure will be readily appreciated from the following detailed description taken in conjunction with the accompanying drawings.

BRIEF DESCRIPTION OF THE DRAWINGS

FIG. 3 is a table of data of magnetic field strength in the work site of FIG. 1.

FIG. 5 is a table of data of magnetic field strength in the work site of FIG. 2.

FIG. 6 is a table of data of magnetic field strength in the work site of FIG. 1.

DETAILED DESCRIPTION OF PREFERRED EMBODIMENTS

Figure 1:
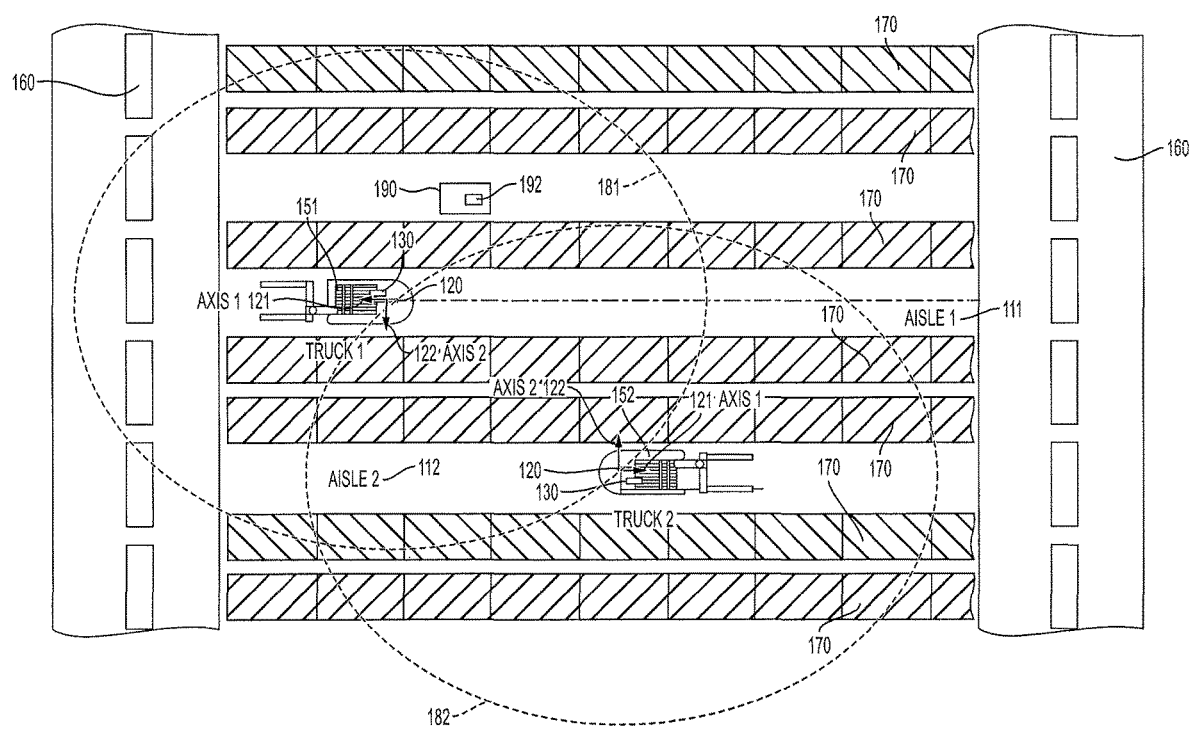
FIG. 1 is a diagram of an exemplary work site at which a proximity detection system is implemented, showing vehicles in adjacent aisles.

The current disclosure provides solutions to some of these specific needs by using vector components instead of only using magnetic field strength. Instead of relying solely upon the strength of magnetic fields as a basis for establishing safety boundaries and for providing detection methodologies, the current disclosure makes it possible to utilize unit vectors or vector components of a magnetic field to better differentiate between true safety threats and non-threats that give the appearance of being a threat and which could result in a nuisance alarm.

Although there are many such situations that can utilize this technology, two have been selected as targets for implementation. One example case is when two vehicles are working in adjacent aisles, both equipped with PDS and/or CAS, where each vehicle may give warnings of potential collisions. Such warnings would be desirable when the two vehicles are in the same aisle, but not desirable when the two vehicles are separated by a row of racks. One example of such an implementation would be two forklifts operating in a warehouse of storage racks, although others are equally applicable. It would be beneficial to prevent nuisance warnings when the vehicles are in an offset, i.e. a non-colliding trajectory.

In one example, two vehicles working within the same aisle, between rows of racks, could potentially collide. PDS/CAS systems can help avoid such collisions by providing warnings when the vehicles are in close proximity to each other, or may even initiate actions to stop the vehicles from moving. See, for example, the Frederick patents. However, magnetic fields produced by PDS/CAS will also pass through the racks to any vehicles or personnel working in different adjacent aisles and result in warnings being given, or actions being taken, when there is no threat of collision. However, described herein are means to separate the components of the composite magnetic field into individual vector components. These vector components are interpreted and logic applied such that the systems distinguish between two vehicles that are in the same aisle, thus being a potential collision risk, and two vehicles that are in offset aisles, thus not posing any danger of colliding. Similar logic may be applied to two vehicles in adjacent lanes of a road instead of two adjacent aisles.

Typically, materials handling vehicles used in warehouses or industrial facilities will use one or more PDS/CAS elements on each vehicle and on each pedestrian. These systems detect and alert based on the proximity of vehicles to each other and proximity of vehicles to pedestrians but they do not provide information as to the relative orientations of the threat to the vehicle or pedestrian being threatened. If a second vehicle is close by or a pedestrian is close by, an operator should usually move the vehicle at a slow speed and be cautious. But, if a vehicle is within an aisle by itself, an operator would not want to be alarmed whenever a second vehicle is within an adjacent aisle. Therefore, the system needs to be able to determine that the second vehicle is within the same aisle, before giving a warning and before taking an action. Making such a determination can be accomplished by using a combination of multiple magnetic fields and a much more complex system configuration, which is not only costly but is very difficult to implement in a multi-aisle or lane environment. However, it is possible to make the needed determination of the location of the second vehicle versus the first vehicle, whether in the same aisle or an adjacent aisle by analyzing the vector components of the magnetic field. In another aspect, the system could also use information such as vehicle orientation and the change in magnetic field strength to supplement its determination.

For purposes of this discussion rack storage systems are broken into two general types, standard rack systems that employ, for example, counter-balanced fork lifts for storing and retrieving materials and high-density storage systems. Standard rack systems have relatively wide aisles (compared to high-density storage systems) through which fork trucks typically carry pallets that are stored or retrieved from the racks on each side of the aisle. In order to store or retrieve pallets of materials the fork truck rotates to a position perpendicular to the racks in order to use the forks to reach into the racks. High-density storage systems typically have tall racks that may be 40-50 feet or more high and narrow aisles. The body of the materials handling vehicle does not rotate but a mechanism is provided for the forks to be separately rotated. An example are those lift trucks manufactured by Raymond Corporation, such as the Raymond Corporation order picker trucks available at the time of this filing. It is this high-density storage configuration to be discussed first with reference to FIGS. 1-3. Although, as described below, the individual aspects of the present descriptions are equally applicable to standard rack systems and traffic lane systems.

Figure 2:
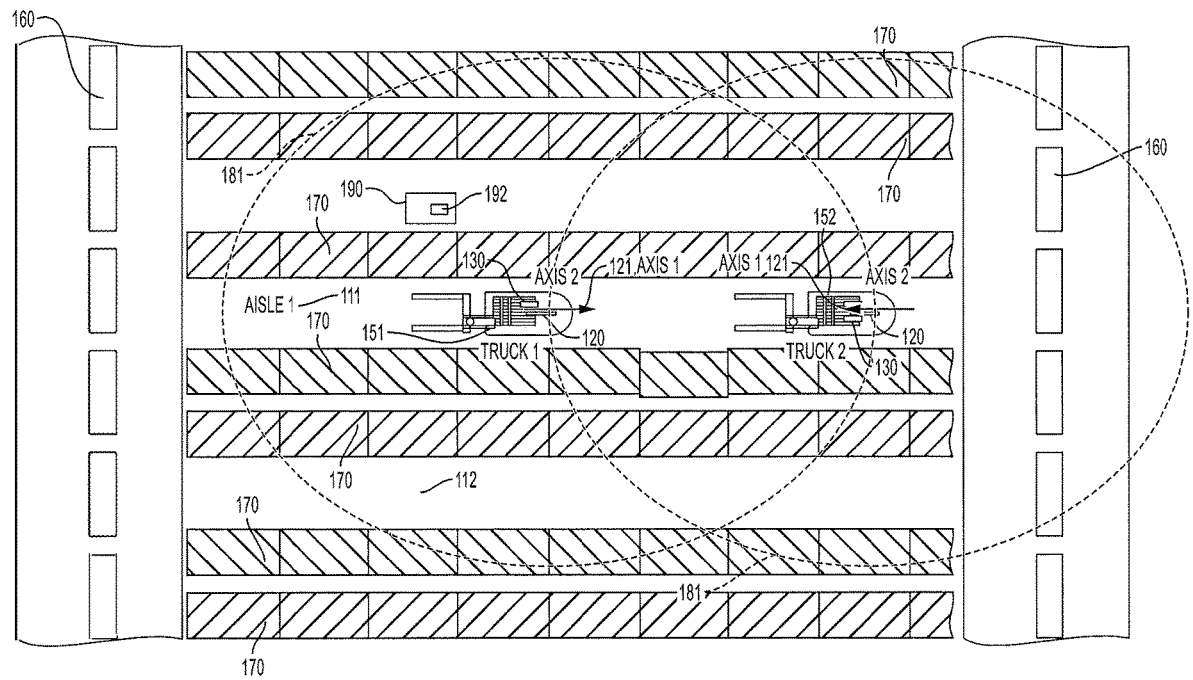
FIG. 2 is a view like FIG. 1, showing vehicles in the same aisle.

In the examples shown in FIGS. 1 and 2, the aisles, aisle one 111 and aisle two 112, are narrow. In such an example aisle, a materials handling vehicle, for example, vehicle or truck one 151 or vehicle or truck two 152, does not rotate within the aisle because the dimensions and spacing of the racks 170 are precise, i.e., the orientations of the vehicles 151, 152 in the aisles 111, 112 are generally the same. The spacing of the aisles is also generally fixed. This means that the magnetic field, generated by magnetic field generators 130 (MFG), as discussed in the Frederick patents, on each vehicle 151, 152 has a known orientation relative to the aisles 111, 112 and also means that individual axis of the respective antennae of magnetic field detectors 120 (MFD) on the vehicles 151, 152 will always be in a known orientation relative to the magnetic field. Certain truck designs also utilize aisle alignment guidance to automate steering in between racks. In an aisle alignment guidance system, a signal, such as low power radio frequency (RF) signal, is aligned with the aisle, and can be sensed by the truck as a signal. In one example, a buried wire is buried wire is energized to emit a low power RF signal. The truck senses the signal and automatically controls the steering mechanism to enable the truck to follow the wire system. Example buried wire guidance systems are currently offered by Raymond Handling Concepts Corporation and, as will be discussed below, can be integrated into and used with disclosed systems.

Also shown in FIGS. 1 and 2 is stationary object 190. Disclosed proximity detection systems can similarly be used to prevent a vehicle, or the like, from colliding with a non-moving object, like stationary object 190. Stationary object 190 may be an obstruction, or hazardous or costly material, which has been placed within the normal path of vehicles and with which collisions wish to be avoided. In such an example, an MFG 192 is placed of affixed on or near the stationary object such that the axes of the MFG 192 are appropriately aligned with the aisle such that nearby vehicles may determine if there is a risk of collision, as will be discussed below.

For the purposes of this example, the magnetic field will be shown as the edge of warning zones, for example the edge of the warning zone for truck one 181 and the edge of warning zone truck two 182. The edge of warning zones 181, 182 indicate a line of equal magnitude of the magnetic field at a typical threshold set to issue a warning as explained in the Frederick patents. Given this special configuration, a mathematical model of the magnetic field can be produced that can be used to predict the strength of the magnetic field along chosen axes, for example, a vector component of axis one 121 and a vector component of axis two 122 represented by axis arrows, that are known relative to the field and the sensors, for any selected point along the aisle. By installing a PDS/CAS with a magnetic field detector 120 having a multi axes antenna on each vehicle 151, 152 properly aligned and equally spaced from each side, reliable, logical decisions can be made. For axis one, the MFD sensor antenna is aligned with the long axis of the MFG ferrite and for axis two the MFD sensor is aligned orthogonal to the long axis of the MFG ferrite.

In summary, the strength of the magnetic field and vector components 121, 122 within a PDS system at a point along the center of the aisle 111, 112 in which the PDS system is located can be predicted. Similarly, the strength of the magnetic field and vector components 121, 122 can be predicted along the centerline of adjoining aisles, as shown in FIG. 2. These measured strengths and vector components will be different so that the system can determine if another vehicle is in the same aisle or an adjacent aisle. Whether the vehicles are in different aisles or wide aisle, this description will refer to them both as "offset."

Magnetic fields produced by solenoid windings, usually around a ferrite material, produce a magnetic field that can be described as having magnetic lines exiting one end and traveling in a curving path to then reenter the ferrite at the other end. If the magnetic field is oscillating, as is typically done on a PDS/CAS system, the magnetic lines extend out, then contract and change polarity, and expand again. For a typical PDS/CAS operating at 73 kHz, this reversal happens 146,000 times per second. Sensing circuits that respond to these oscillations are unable to determine the polarity of this oscillating field. However, a vector axis of a sensing circuit can be aligned with the long axis of the solenoid/ferrite to obtain the maximum field. Other sensing axes that are orthogonal to the ferrite axis will detect essentially no magnetic field so long as they are either aligned with the ferrite or are parallel with the ferrite in a plane that is perpendicular to the ferrite and also passing through the center of the ferrite. It should be noted that in real-world applications, surrounding racks and materials can distort the shape of a field and cause the measurement by the other sensing axes to be non-zero. If orthogonal sensing elements are placed at any other locations, they will sense the vector components of the magnetic field that exist at the point where they are located. Thoughtful measurement and analysis of these vector components allow determining whether two trucks, outfitted with a PDS/CAS system having a multi-axis antenna are in the same aisle or different aisles.

Figure 4:
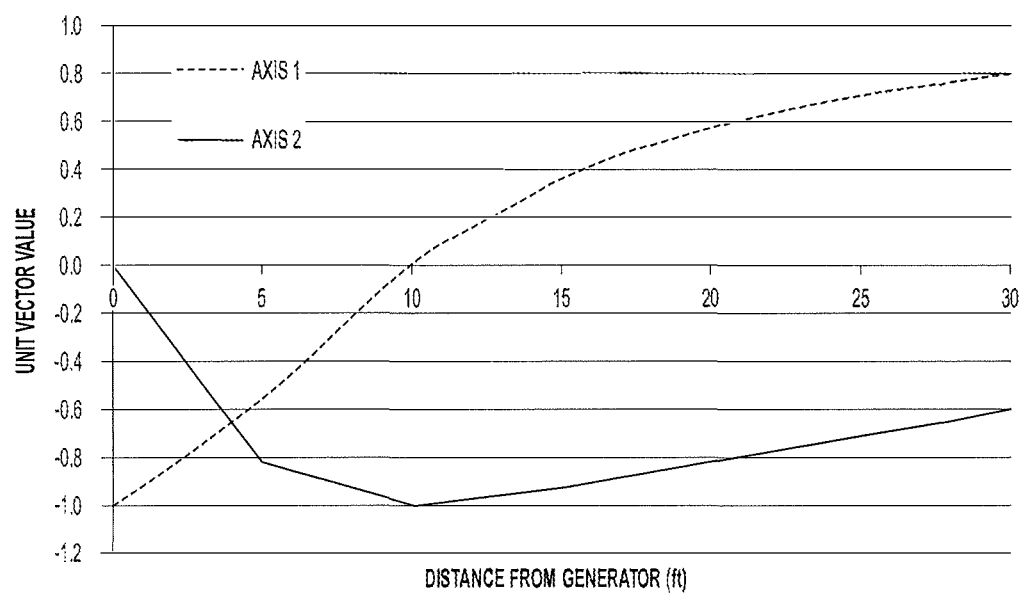
FIG. 4 is a graph of the data of FIG. 3.

FIGS. 3 and 4 show a data table and plot, respectively, for trucks 151, 152 in an adjacent aisle, as in FIG. 1. The data shown in FIG. 3 is for magnetic field strength along a line for an aisle 14 feet from the adjacent aisle and shows example magnetic field strength and example two unit vector components. The composite magnetic field strength in units of Ampere's per meter (A/m) shows that composite field strength increases as the two trucks 151, 152 get closer together. The Axial field unit vectors (axis one and axis two) show the x and y vector components of the composite magnetic field normalized to 1.

A graph of the data in FIG. 3 normalized to 1 is shown in FIG. 4. Data is shown from 0 to 30 ft. The vector component strength rises and falls along the line. That is because of the physics and orientation of the magnetic field lines. In one example, the evaluation of the vector components take place at the edge of the warning zones 181, 182 and does not re-evaluate until clear of the warning zone 181, 182 to avoid the rise near the field generator in axis two, which will be discussed further below. In another example, the evaluation of the vector components begins to take place at the edge of the warning zones 181, 182 and a final determination with respect to whether or not to alarm or take action, such as issue a danger alarm and/or stop the truck, takes place prior to unit vector value rising again at close proximity. This feature will be discussed in more detail below. For the case of trucks in the same aisle, the magnetic field strength increases as the trucks get closer together and the unit vector components remain the same (axis 1=1 and axis 2=0) until the trucks get close together.

As mentioned above, the more traditional rack systems (not shown) have wider aisles and fork lifts rotate within the aisles when storing or retrieving materials. The technical strategy discussed above will not be as effective because the fork lifts are rotating as needed and the vector axes are rotating. Therefore the alignment of the trucks is not automatically known if both are within the racks. A solution to this added complexity is to take advantage of the fact that all the racks are generally precisely aligned in one direction. By use of a system to orient the antenna axis and/or compensate for rotation, corrections can be made to the mathematics to translate the coordinates, at least to some degree. In one example, a magnetic compass, or other direction providing systems such as solid state compasses, GPS receivers, gyrocompasses, and/or accelerometers are used in the PDS/CAS system to account for the direction of the vehicle. Other examples could include visual reference recognition or other fixed reference beacon technologies. In another example, the antennas could be gyroscopically, or the like, stabilized to remain in a single direction such that direction compensation is not required.

For example, a compass is used on one truck to determine its orientation with respect to the longitudinal axis of the aisle. That orientation is communicated to the other truck(s) in the surrounding area for use during co-alignment determinations (discussed below). The orientation can be communicated through radio frequency (RF), for example the RF communication discussed in the Frederick patents, or through other communication means such as coded magnetic field pulses.

One good consequence of this wide (traditional) rack configuration is that there is little danger of collision by a fork truck if it is rotated within the aisle since any forward motion is limited by the racks. Therefore, in one example, the functions of the CAS system can be altered or interrupted whenever the truck rotates out of alignment of the aisle. So long as the truck is aligned with the aisle, decisions can be made about whether the truck is within the aisle of another truck or is within an adjoining aisle.

Fork trucks often travel on roadways, for example roadways 160 (FIGS. 1-2) that connect between areas within a facility. As trucks travel this path, they will often pass each other. A typical PDS/CAS system will minimize these nuisance alarms by having a time out feature whereby the alarm only sounds for a short while. In some cases, a visual alarm may continue as long as two trucks are in close proximity but the audible sound may be limited to a short period of 3-5 seconds. It is desirable for these nuisance alarms to be prevented. One possible solution is to install a Mechanized Area Controller which will command the PDS/CAS system to not alarm for a potential collision with another truck. (See the Frederick patents).

Figure 7:
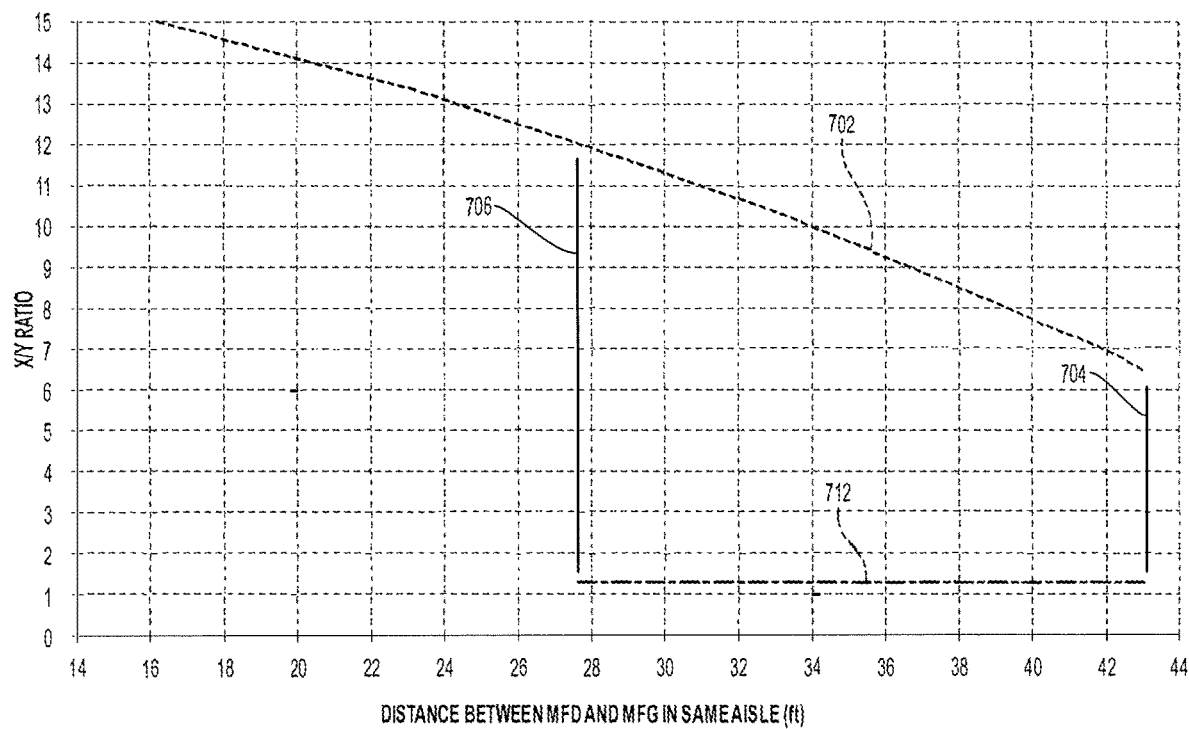
FIG. 7 is a graph of the data of FIG. 5.

Shown in FIGS. 5 and 7 are a table (FIG. 5) of data of magnetic field strength in a work site like that of FIG. 2 and corresponding graph of a curve fit to that data (FIG. 7). In FIGS. 5-8, "X" refers to "axis one" 121 (FIGS. 1-2) and "Y" refers to "axis two" 122 (FIGS. 1-2). FIG. 5 shows the sensed voltage in millivolts (mV) for the X, Y, and Z axis and the composite voltage for various distances between one vehicle's MFG and another vehicle's MFD in the same aisle, like in FIG. 2. Composite Voltage ("CV") is the vector summation of all vector field strength magnitudes detected by the magnetic field detector 120 and summed (either digitally or via analog voltage combination). As shown the CV varies according to the distance between the MFG and MFD with closer distances resulting in higher CV and further distance resulting in lower CV. In addition, the corresponding X/Y ratios and curve fit of the X/Y ratios are also shown. With reference to FIG. 7, shown as plot 702 (FIG. 7) is the X/Y ratio curve fit of magnetic field vector strength detected by one of the magnetic field detectors 120 of the trucks 151, 152 of the magnetic field generated by the other vehicle's MFG 130 where the two vehicles are in the same narrow aisle. For example, plot 702 shows the ratio of the detected axis one 121 strength with respect to the axis two 122 strength. Plot 702 shows the component vectors are predominantly X (or axis one 121) because the X/Y ratio is greater than 1 between first threshold 704 and second threshold 706 and is thus, in the same aisle (like in FIG. 2). The first and second thresholds will be discussed below with respect to FIG. 8. Knowing the trucks 151, 152 are in the same aisles, the systems can react (or not) according to the programmed safety configuration, which will also be discussed further below.

Figure 9:
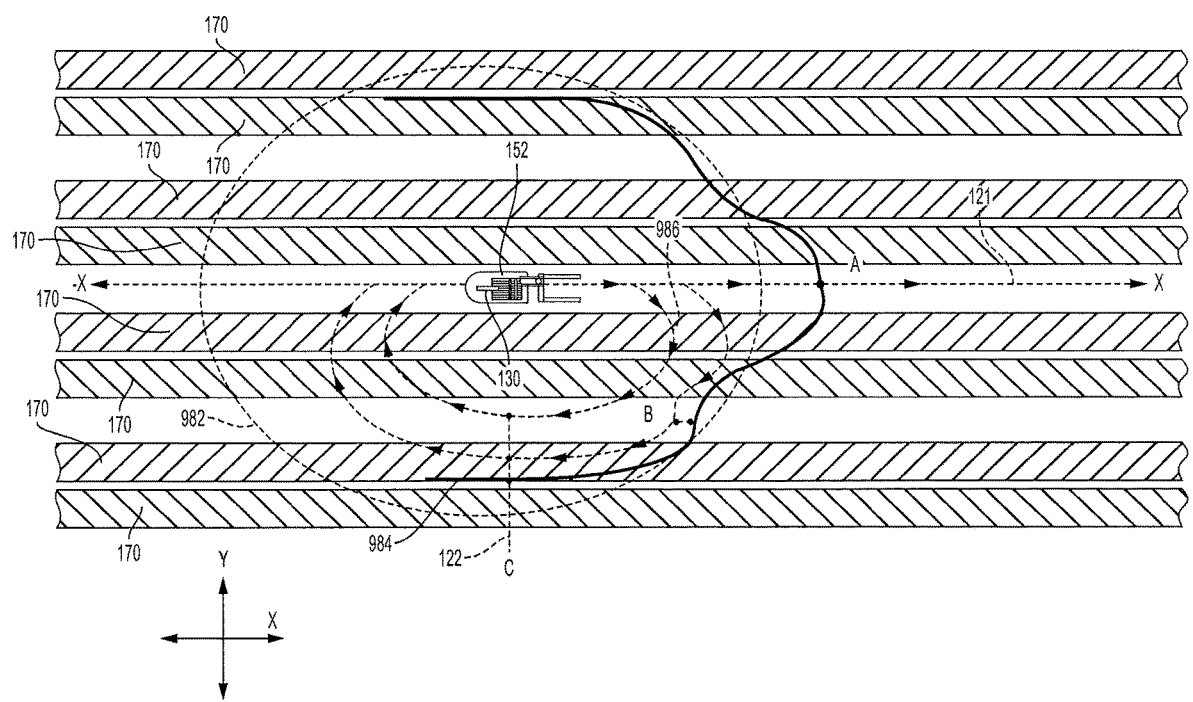
FIG. 9 is a diagram of exemplary magnetic fields at a worksite.

FIG. 9 shows how one example magnetic field might be distributed within an example rack system. The ellipses 986 is the approximate shape of the magnetic field if the ferrite were in open space with 982 being the edge of an approximate ideal warning zone. Line 984 depicts that the composite field may be extended about 20% along the aisle in which the ferrite is located, but is pulled in some on the sides due to potential interaction with surrounding materials. It should be noted that only a portion of the field lines are drawn. For example only a portion of ellipses 986 and 984 are shown for clarity.

One potential interaction is that although the "Y" component of the field line would be larger in the adjacent aisle than in the same aisle, even without the effect of the racks on the field, the racks magnify this difference. As described in Frederick patents, the magnetic field is oscillating so that one example system does not distinguish between the direction of the field on a half cycle and the reverse direction on the second half of the cycle. Example sensing circuits are tuned circuits and thus, in one configuration the system only detects the magnitude of the oscillation for each axis.

The magnetic field lines 986 that are indicated with arrows leave the ferrite going one direction but then circle around and when they pass the ferrite, but in the adjacent aisle, the direction is in the opposite direction from that in the front. In one example, the vector component does not detect the difference in direction. This can be advantageous to reduce complexity of the system. To take advantage of this design, example vector systems utilize first and second composite voltage thresholds (described below) to determine when to make its offset (vector component) determination. As shown in FIG. 9, "A" is at location in the same aisle and aligned with the long axis of the MFG 130 ferrite. "B" is at the midpoint of the adjacent aisle and "C" is at a location orthogonal to the long axis of MFG 130 ferrite.

Figure 8:
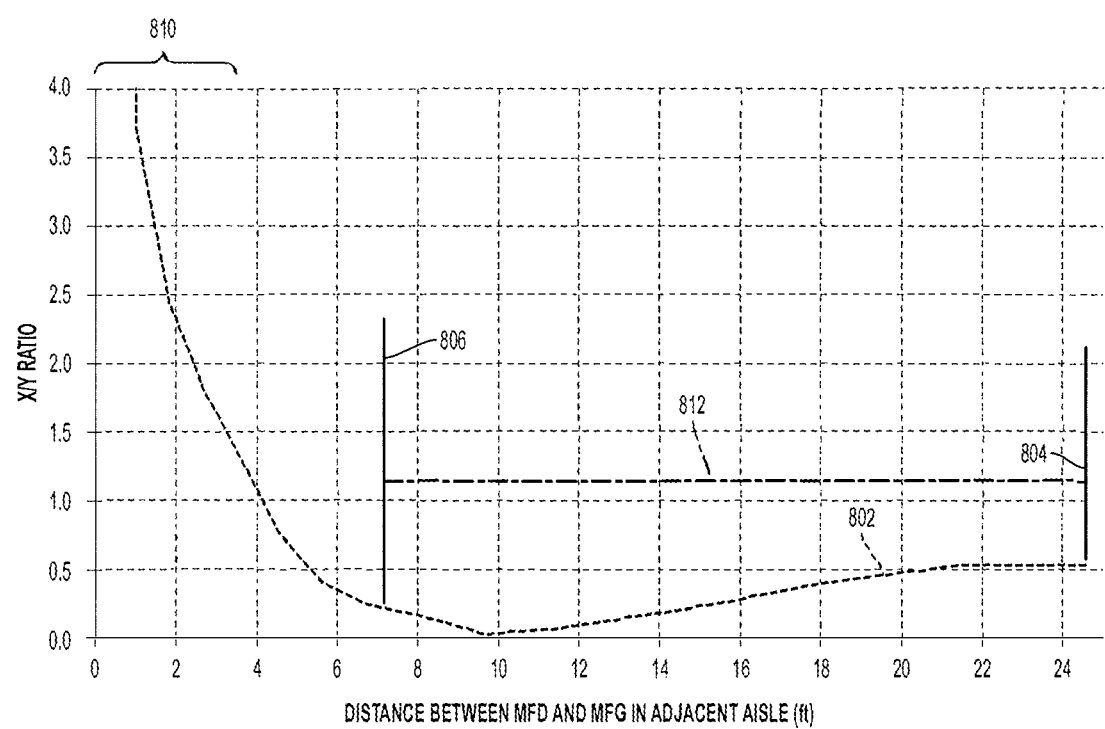
FIG. 8 is a graph of the data of FIG. 6.

Shown in FIGS. 6 and 8 are a table of data (FIG. 6) of magnetic field strength in a work site like that of FIG. 1 and corresponding graph of a curve fit to that data (FIG. 8). FIG. 6 shows the sensed voltage in millivolts (mV) for the X, Y, and Z axis and the composite voltage for various distances between one vehicle's MFG and another vehicles MFD in adjacent aisles, like in FIG. 1. In addition, the X/Y ratio are also shown. With reference to FIG. 8, shown as plot 802 is an X/Y ratio of magnetic field vector strength detected by one of the MFD 120 of the vehicles 151, 152 of the magnetic field generated by the other vehicle's MFG 130 graphed as function of the distance between the MFD 120 and the MFG 130. Plot 802 shows the component vectors is predominantly Y (or axis two 122) because the X/Y ratio is less than 1 between first threshold 804 and second threshold 806 and is thus, offset. The trucks 151, 152 are shown as offset in different aisles as shown in FIG. 1. However, trucks 151, 152 could also be offset in wide aisles and result in a similar plot 802. Knowing the trucks 151, 152 are offset, the systems can react (or not) according to the programmed safety configuration, which will be discussed further below.

Depending on the working environment, including the configuration of the storage racks and the amount of offset between vehicles, either between aisles or between lanes of a road, and the effects discussed with reference to FIG. 9, the sensed X/Y ratio of vector components may increase at close distances even when the trucks are offset from each other (e.g., in different aisles or lanes). This can be seen, for example at region 810 of FIG. 8, where the X/Y ratio increases above 1 at short distances between MFD 120 and MFG 130. Thus, the accuracy of the offset criteria check can be improved if determined prior to reaching region 810. In one example, an offset criteria check is performed at or in between first threshold 804 and second threshold 806. For example, as shown in FIG. 8, an offset criteria check is performed at second threshold 806, i.e., where CV equals 2.0 V. First threshold criteria is set at 0.5 V and establishes a lower floor, below which no Offset determination is calculate. In another example a first offset criteria check is performed at first threshold 804 and a second offset criteria check is performed at second threshold 806. In yet another example, one or more offset criteria checks is performed at second threshold 806.

Thresholds 704, 706, 804, 806 values are determined according to the operating environment and voltage of the vehicle and associated MFG/MFD systems. When described vector component MFD/MFG systems are first introduced into a work environment, vehicles are operated such that the data, or similar, of FIGS. 5-6 are collected. Second threshold 806 is chosen by the installer, safety supervisor, or the like, such that at a minimum the vehicle has a safe stopping distance and reaction time for the given work environment and vehicle. In addition second threshold 806 is chosen such that a rise in X/Y ratio (i.e., region 810) will occur at higher CV (shorter distances) than the second threshold 806 and/or such that X/Y ratio remains below 1 between the first threshold 804 and the second threshold 806.

Based on the XY ratios determined in accordance with the actual data collected and shown in FIGS. 5 and 6 and as shown in FIG. 7, first threshold 804 is set to CV=2.0 V, which is typically between about 26 and 28 feet distance between vehicles and represents a safe stopping speed for two moving vehicles in the particular work environment in which the data was collected. First threshold 804 is set to CV=0.5 V, which is typically between about 42 and 44 feet distance between vehicles and represents a distance at which a collision is unlikely in the particular work environment in which the data was collected. Therefore at CV<0.5 V further determinations, or at least the offset determination, are not needed until the CV rises.

The actual CV values for the first and second thresholds 804, 806 will depend on the required safety criteria (type, speed, and relative danger of the harm). Fast, more hazardous vehicles that can result in greater physical and economic harm may require longer stopping distances and thus and second threshold 806 with a lower CV. In one example, the first thresholds 704, 804 are equal to the composite voltages at the edge of warning zones 181, 182 (FIGS. 1-2).

It should be noted that vehicles 151, 152 include only one set of first and second thresholds 704, 706, 804, 806, i.e., 704 and 804 are only labeled differently for purposes of describing the differences between offset and not-offset scenarios as depicted in FIGS. 1 and 2. However, a particular vehicle would have a single first threshold and single second threshold at any given time for making offset determinations.

Table 1 describes several case scenarios for one example safety configuration and method. It should be noted that the order of each of the below described determinations or tests can be adjusted based on the operating environment and the needs of the appropriate safety supervisor. In addition, not all determinations are required in all circumstances. Whether a particular determination is made, as well as the resulting action of such determination, may also be adjusted.

TABLE 1

| CASE | Danger Zone | Closing | Co-Align | Offset (Vector component) | Action |
|---|---|---|---|---|---|
| (a) | NO | YES | YES | OFFSET | MIN. WARNING |
| (b) | NO | YES | YES | NOT OFFSET | SLOW TRUCK, WARNING |
| (c) | NO | NO | YES | OFFSET | NO ACTION |
| (d) | NO | YES | NO | OPTIONAL | SLOW TRUCK, WARNING |
| (e) | Yes | NO | YES | OFFSET | REMINDER |
| (f) | Yes | YES | YES | OFFSET | MINIMUM WARNING |
| (g) | Yes | YES | YES | NOT OFFSET | STOP, WARNING |

One example method may begin based on a pre-condition. For example, in one example, the pre-condition can be a truck 151, 152 is within the edge of a warning zone 181, 182 of another truck 152, 151 (FIGS. 1-2). Such a determination can be made by measuring the composite voltage of signals received by the magnetic field detectors 120 being above a threshold voltage, for example, first thresholds 704, 804 (FIGS. 7-8). For the rest of this discussion, we will describe the method from the perspective of truck two 152 within the edge of warning zone 181 produced by truck one 151. However, the reverse may be equally applicable.

First, as shown in the first column of TABLE 1, a determination is made whether the truck 152 (or the magnetic field detector 120 on the truck) is within a danger zone of truck one 151. If it is within the danger zone then the determination is affirmative or "YES." A danger zone is described in the Frederick patents as being a zone of increased magnetic field strength which is stronger than the edge of warning zone 181. As described in the Frederick patents, multiple MFGs may be used to shape the danger and warning zones and/or create a safe-zone. The danger zone described in the present application may be any of those previously described danger zones in the Frederick patents.

As shown in the second column of TABLE 1, a determination is also made whether the distance between truck 152 and the MFG 130 of truck one 151 is closing. In one example configuration, the composite magnetic field strength is measured at two different times and if the composite field strength is increasing, the relative distance between the trucks 151 and 152 is closing resulting in a YES.

As shown in the third column of TABLE 1, a determination is also made whether the longitudinal axis of the truck 152, axis 1 shown in FIGS. 1-2, is co-aligned with that of its aisle or other reference point. This was described above with respect to the potential system used to orient the antenna axis and/or compensate for rotation in an aisle or lane. In one example, a compass orientation of the truck 151 is communicated to the truck 152 via RF and a determination is made at the truck 152 whether its own compass orientation is co-aligned with that of the truck's 151 compass orientation. If it is not co-aligned then there may be less of a need or desire to measure vector components, discussed next, because the resulting components will be altered by, for example, vehicle rotation. If however, the rotation is compensated for or the antenna is rotationally fixed with respect to the axis, then it may be desired to proceed with the vector component measurement.

As shown in the fourth column of TABLE 1, a determination is made whether the vehicles are offset from each other, i.e., in differing aisles 111, 112 (FIGS. 1-2) or lanes of a wide aisle. The determination is made by comparing the ratio of axis one 121 to axis two 122, as shown in the tables and plots of example X/Y ratios of FIGS. 5-8. The offset threshold 812 (FIG. 8) of X/Y ratio is the threshold for being offset versus being not offset. If the X/Y ratio is equal to or above the offset threshold 812, the vehicles are considered to be not-offset. Whereas if the X/Y ratio is below the offset threshold 812, the vehicles are considered to be offset. The particular offset may be determined for each operating environment, however, the expected threshold is about 1. Such conditions such as the surrounding material and the distance between aisles or lanes may also affect the ratio threshold. As shown in FIG. 8, one example of an offset threshold 812 is about 1.1. The offset threshold 712 (FIG. 7) is the same as the offset threshold of FIG. 8. As recited above, the offset determination may, in one example, be determined on or between first composite voltage thresholds 704, 804 and second composite voltage thresholds 706, 806. If the X/Y ratio is determined to be at or above the offset threshold 812, then the trucks are considered to be not offset and likely pose a greater threat to each other than if the X/Y ratio is determined to be below the offset threshold 812, in which case it is considered offset.

Example actions resulting from the above combination of determinations by the system vary with respect to the potential danger posed by the determined safety situation. In case (c), the vehicle did not detect a danger zone, is not closing on another vehicle, is co-aligned with the axis and offset from another vehicle. The vehicle is likely at a safer distance from another vehicle in another aisle or lane and moving in opposite directions. Therefore, no action or warning is needed. Case (a) is the same as case (c) except a determination is made that the distance between the vehicles is getting smaller. This likely indicates that situation is like that in case (a), but the vehicles are moving toward each other. Therefore, a minimum warning may be required in the form of visual, haptic, or auditory warning, beep(s), light(s), vibration(s) or tone(s).

Case (b) is the same as case (a) except a determination is made that the trucks are not offset from each other. This likely indicates the situation is like that in case (b), but the vehicles are now moving towards each other in the same aisle or lane. Because this case will likely increase the risk of an accident, the action is correspondingly increased in degree. For example, the audible or visible warning could be increased either through a change in frequency, color (e.g. transition from green to yellow or from yellow to red), duration (e.g. solid and blinking), tone, or loudness. In addition, the magnetic field detector 120 is interfaced with a vehicle control system through a control bus (e.g., CAN bus) or other throttle control system to automatically slow the vehicle or limit a maximum speed while the conditions that lead to the determination persist.

In case (d) a determination was made that the vehicle is not co-aligned with the relevant axis, e.g., the longitudinal axis of an aisle or lane. Thus, it is possible that the truck is in a traditional storage rack system with racks wide enough for vehicles to turn and load or unload pallets from storage shelves. In this case, the truck has a reduced chance of colliding with another truck because its forward and backward motion is limited by the racks. It is also possible that the other vehicle is within a roadway 160 and there is risk of exiting the aisle and colliding with the vehicle in the roadway. In either situation it may be prudent, at the safety supervisor's discretion, to maintain speed restrictions and warnings while the vehicles remains within the warning zone 181.

In case (e) a determination is made that the vehicle is within another vehicles' danger zone meaning they are likely closer to each other than in cases (a)-(d), described above. However, the vehicles are not getting closer to each other (CLOSING=NO) and they are OFFSET from each other. Therefore, a lesser warning or a reminder is issued which may serve to remind a vehicle operator to check their surroundings prior to changing the position or speed of the vehicle. This reminder may be any visual, audible, or haptic indication.

Case (f) is the same as case (e) except that in case (f), the distance between the vehicles is closing as determined via either a vector component or composite reading of a magnetic field strength (CLOSING=YES). Thus, there is an increase in risk as compared to case (e) and a corresponding increase in action, e.g., a minimum warning action may be prudent. It should be noted that the offset determination as used above provides greater flexibility to the safety supervisor to prevent nuisance alarms. This is particularly true when the vehicles are otherwise in each other's danger zones. If the vector components were not determined and integrated into the alarm and warning systems, a vehicle operating within the danger zone (but in an adjacent aisle/lane) would create a series of nuisance alarms, and/or cause the vehicles to stop functioning altogether. However, with the vector component determination, the systems can eliminate or reduce the frequency of alarms when the risk of real danger is minimal.

Case (g) is the same as case (f) except that in case (g), the offset determination results in a NOT OFFSET result. Thus, it is likely the vehicles are in the same aisle/lane, within the danger zone, closing distance, and thus in a dangerous situation. The system is configured to issue a stronger warning alarm, including higher and/or louder pitches, having a longer duration, higher frequency and/or different colors. Alarms and warnings can also include haptic feedback to the chair, steering wheel, or helmet as discussed in the Frederick patents. In addition, the magnetic field detector 120 is interfaced with a vehicle control system through a control bus (e.g., CAN bus) or other throttle control system to automatically slow or stop the vehicle or limit a maximum speed (further) until the dangerous situation is resolved.

As an alternative or in addition to these above described case determination and control methods, additional determinations and/or control can be added to assist with transitions into and out of aisles 111, 112 to or from roadways 160. For example, a mechanized area controller (MAC), as described in the Frederick patents, can be placed over the side of the roadway nearest to the aisles. In this position, trucks on that side of the roadway and trucks within the aisles are programmed to alter their operation in the operating zone of the MAC. For example, trucks on that side of the roadway can be configured to be limited to a slower speed. And trucks at the aisle exits can be configured to be limited to a slower speed. In addition, the MAC can also be configured to reduce magnetic field strengths in its control zone.

The above case descriptions are only exemplary and illustrative uses and combinations of utilizing magnetic vectors for increased safety. Not all determinations must be made and the determinations may be made in differing orders and in different combinations. In addition each of the determinations, thresholds, instructions, and the like may incorporated into the storage or memory of an MFG, MFD, or respective vehicle and executed by each respective processor/controller.

The above description and drawings are only illustrative of preferred embodiments and are not intended to be limiting. Accordingly, the inventions are not considered as being limited by the foregoing description and drawings, but are intended to embrace all such alternatives, modifications, substitutes and variances. For example, much of the above description has focused on a particular use case scenario of two or more fork trucks. However, the disclosure is equally applicable to any mobile or immobile hazardous location within a worksite. Hazardous locations include vehicles, hand trucks, pedestrians, holes in the ground, hazardous fueling stations, sensitive or costly equipment, high traffic regions, any other location worth protecting or prudent to establish protections from, or the like. The disclosure is also equally applicable to where vector components are determined between an MFG at a hazardous location and personal alarm device (PAD), as described in the Frederick patents. Any subject matter or modification thereof which comes within the spirit and scope of the disclosure is to be considered part of the present invention.

What is claimed as new and desired to be protected by Letters Patent of the United States is:

1. A proximity detection system, comprising:
   at least one magnetic field generator associated with a first location configured to generate at least one magnetic field; and
   at least one magnetic field detector associated with a second location, the at least one magnetic field detector having at least two detection axes, wherein the at least two detection axes are oriented at angles from each other, wherein the magnetic field detector is configured to:
   (i) determine a strength of the magnetic field in each of at least two vector components corresponding to the at least two detection axes;
   (ii) determine, at a plurality of distances between the at least one magnetic field generator and the at least one magnetic field detector, ratios of the strength of the magnetic field in one of the at least two vector components to the strength of the magnetic field in another of the at least two vector components; and
   (iii) generate a signal based on the ratios to indicate a positioning of the first and second locations with respect to one another.

2. The proximity detection system of claim 1, where the first location is one of a vehicle, a stationary location, and a person.

3. The proximity detection system of claim 1, wherein the second location is one of a vehicle, a person, and a stationary location.

4. The proximity detection system of claim 2, wherein the first location is an immobile location.

5. The proximity detection system of claim 1, wherein the axes are orthogonal.

6. The proximity detection system of claim 1, wherein the magnetic field generator and/or magnetic field detector includes a direction providing system and the magnetic field detector is configured to generate a signal based on the ratios and the direction providing system.

7. The proximity detection system of claim 6, wherein the first location is a first vehicle and the second location is a second vehicle, each of the first and second vehicles having respective magnetic field generators (MFG) and magnetic field detectors (MFD), wherein each vehicle generates a compass direction and is configured to generate the signal based on the ratios and the compass directions.

8. The proximity detection system of claim 7, wherein no signal is generated unless the first and second vehicles are approaching one another.

9. The proximity detection system of claim 1, wherein the magnetic field detector is further configured to determine the relative strength of the at least two vector components at a field strength threshold.

10. The proximity detection system of claim 1, wherein the first location is a first vehicle and the first vehicle determines its orientation based on a signal received from a buried wire aisle alignment guidance system.

11. The proximity detection system of claim 6, wherein the direction providing system is a magnetic compass, solid state compass, GPS receiver, gyrocompass and/or accelerometer.

12. The proximity detection system of claim 7, wherein the first vehicle is adapted to transmit its compass heading to the second vehicle and the second vehicle is configured to generate the signal based on a comparison between the two compass directions.

13. A method of proximity detection, the method comprising the steps of:
generating at least one magnetic field associated with a first location;
determining a strength of the magnetic field at a second location in each of at least two vector components corresponding to at least two detection axes of a magnetic field detector, wherein the at least two detection axes are oriented at angles from each other;
determining, at a plurality of distances between the first location and the second location, ratios of the strength of the magnetic field in one of the at least two vector components to the strength of the magnetic field in another of the at least two vector components; and
generating a signal based on the ratios to indicate a positioning of the first and second locations with respect to one another.

14. The method of proximity detection of claim 13,
wherein the second location is one of a vehicle, a person, and a stationary location,
wherein the first location is an immobile location, and
wherein the axes are orthogonal.

15. The method of proximity detection of claim 14, wherein the first location is a first vehicle and the second location is a second vehicle, each of the first and second vehicles having respective magnetic field generators (MFG) and magnetic field detectors (MFD), wherein each vehicle generates a compass direction and generates the signal based on the determined magnetic field vector component strengths and the two compass directions.

16. The method of proximity detection of claim 15, wherein no signal is generated unless the first and second vehicles are approaching one another.

17. The method of proximity detection of claim 13, wherein the first location is a first vehicle and the method further includes determining, by the first vehicle, its orientation based on a signal received from a buried wire aisle alignment guidance system.

18. The method of proximity detection of claim 15, further comprising transmitting, by the first vehicle, its compass heading to the second vehicle and the second vehicle generating the signal based on a comparison between the two compass directions.

19. The proximity detection system of claim 1,
wherein the distances are greater than a minimum predefined distance and less than a maximum predefined distance between the at least one magnetic field detector and the at least one magnetic field generator; and
wherein the magnetic field detector is configured to determine whether the at least one magnetic field generator and the at least magnetic field detector are offset from each other in different aisles based on a comparison of the ratios to a predefined offset threshold value.

20. The method of claim 13,
wherein the distances are greater than a minimum predefined distance and less than a maximum predefined distance between the first location and the second location, the method further comprising:
determining whether the first location and the second location are offset from each other in different aisles based on a comparison of the ratios to a predefined offset threshold value.

* * * * *